R. L. MUIR.
CHAIN SAW ATTACHMENT.
APPLICATION FILED APR. 16, 1908.
951,510.
Patented Mar. 8, 1910.
2 SHEETS—SHEET 2.
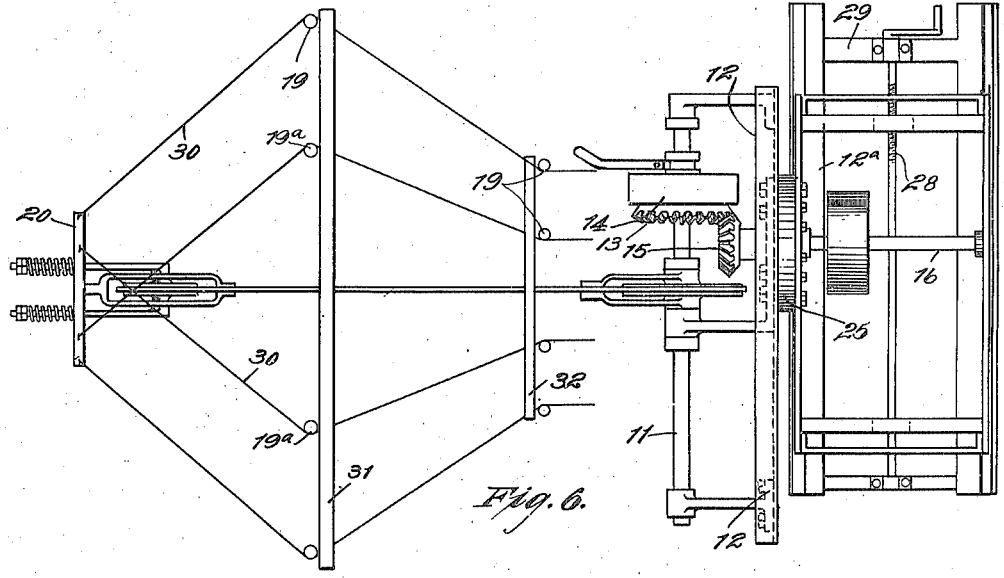
Fig. 6.
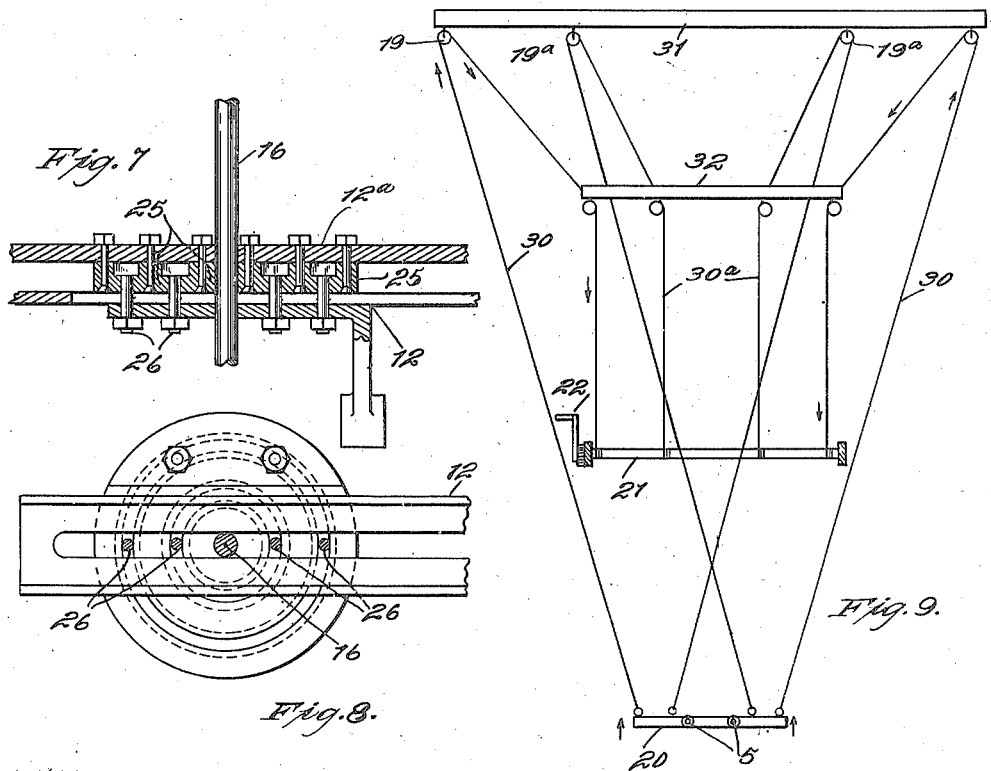
Fig. 7.
Fig. 8.
Fig. 9.
Witnesses:
F. E. Maynard.
Ca. Enfield.
Inventor
Reginald L. Muir:
By
Geo. H. Strong.
Atty.

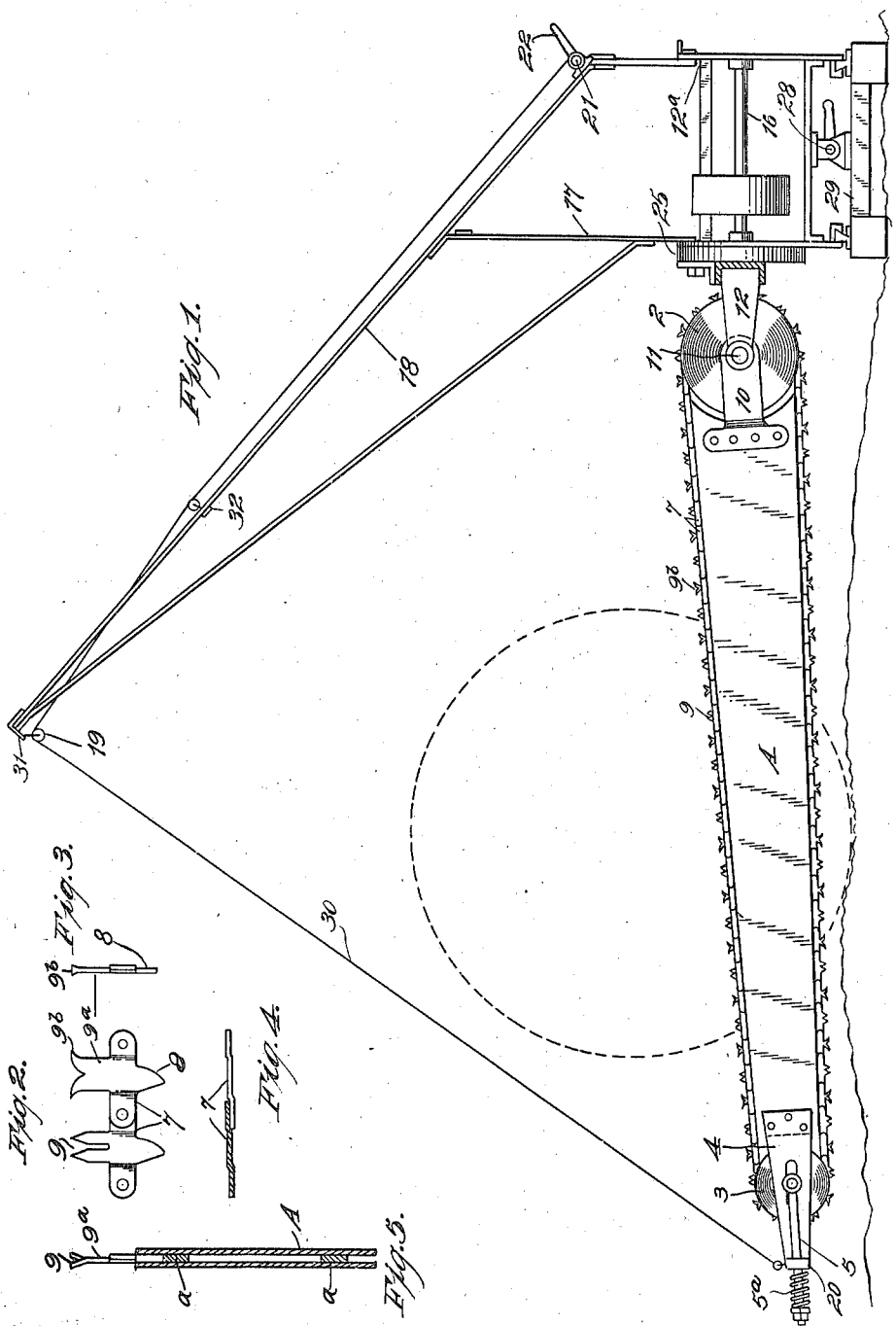

UNITED STATES PATENT OFFICE.

REGINALD L. MUIR, OF SAN FRANCISCO, CALIFORNIA.

CHAIN-SAW ATTACHMENT.

951,510.     Specification of Letters Patent.     Patented Mar. 8, 1910.

Application filed April 16, 1908. Serial No. 427,521.

*To all whom it may concern:*

Be it known that I, REGINALD L. MUIR, citizen of the United States, residing in the city and county of San Francisco and State of California, have invented new and useful Improvements in Chain-Saw Attachments, of which the following is a specification.

My invention relates to improvements in that class of saws, in which the cutting teeth are connected together to form an endless flexible chain which is carried over sprockets through which power is transmitted to drive the chain of teeth.

It consists in the combination of parts, and in details of mechanism which will be more fully explained by reference to the accompanying drawings, in which—

Figure 1 is a side elevation. Figs. 2, 3, 4 and 5 are details of the saw. Fig. 6 is a plan. Fig. 7 is a section; and Fig. 8 is a face view of the channel disks. Fig. 9 is a plan of the handling device.

My present invention is an improvement upon an apparatus patented by me Sept. 3, 1907 No. 865/118; and its object is to provide certain details by which I simplify the construction, enlarge the scope of movement, provide a better means for handling the mechanism and changing its position and improvements in the saw, and the connections therewith.

A is a distance piece having journaled at either end the sprocket-wheels 2 and 3, around which sprocket-wheels an endless saw is adapted to travel. These sprocket-wheels are channeled or formed with grooves, with which the driving spurs 8 of the saw-teeth engage and thus serve to guide the saw and maintain it in its proper line of travel. The outermost idler sprocket is preferably journaled in a yoke 4 fixed to the outer end of the distance-piece A, and the sides of the yoke are slotted so that the shaft of the sprocket-wheel may pass through the slots. The ends of the shaft are turnable in bearings in the ends of the adjusting rods 5, and these rods are movable so as to regulate and maintain the tension of the chain saw.

5ª are tension springs upon the take-up rods 5, and by turning the nuts with relation to the yoke which carries the shaft bearings, I provide for a greater or less tension upon the saw, and sufficient yielding to compensate for varying strains.

The saw is formed of links 7 pivoted together as shown in Fig. 2, and the ends of these links are offset to opposite sides of the central toothed portion, and are pivoted together so that the main parts of the links which carry the teeth and guide plates or lugs, will travel substantially in line with each other. In the present case I have shown spurs or lugs 8 projecting from the inner edges of the link plates, and the toothed portion or portions 9 project on the opposite side of the links. These teeth may be formed in any usual or suitable manner, either double and having a channel extending between them down to approximately a line with the upper edge of the link and having the points set in opposite directions to form a kerf, or the tooth body may be made single, as shown at 9ª, and it is formed with points 9ᵇ diverging in the line of travel of the saw, and these points are set or spread to provide for the kerf. The backs or interior edges of these teeth thus formed are curved inwardly, and these lines of curvature meet about the center of the vertical line of the body 9ª. By constructing the saw in this manner, the alternate teeth have the cutting bits 9ᵇ diverging forward and backward. The forward bits produce the cut, while the rear points follow in the cut formed by the forward ones, and by their contact with the bottom of the cut, they form guides to prevent the gouging of the forward tooth points 9ᵇ, and they thus make the work more regular, and the strain upon the saw less jerky and uneven. Another advantage of these double points is that if by any reason the saw should become pinched by a partial closing of the kerf after the saw is wholly within the log, it will be seen that the upper part of the saw returning over the top of the sprockets, will carry the points in the opposite direction from the cutting movement below, and these teeth serve to cut their way out of the saw kerf in the reverse movement so that the saw may be lifted from the log.

The rear or driving sprocket around which the saw passes, is journaled in a yoke or frame 10 which extends down upon each side of the sprocket, and is supported upon the power shaft 11 which drives the sprocket. This shaft is journaled in a frame 12, and it carries a gear-wheel 13. This gear-wheel is fixed to the back of one member of the friction clutch 14, so that the two parts turn together, and by any usual or well known clutch mechanism and actuating lever, the other part of the clutch may be engaged so that the driving shaft will be rotated, or by throwing the clutch out, it will remain stationary.

The bevel-gear meshes with a pinion 15 upon the motor-shaft 16 through which power is transmitted. The shaft extends through an opening in the frame 12, and by means of circular channeled disks 25 that portion of the frame carried by the saw and its shaft, may be revolved entirely around the axis so that the saw can be made to cut horizontally, vertically, or at any angle between the two. The frame 12 is made of channel or angle iron, to each end of which the bracket bearings for the shaft 11, are bolted. The frame is slotted as shown in Fig. 8.

The center bracket forms a bearing with a long foot, and is bolted to the face-plate 12 of the disk 25, through the slot in the frame 12. The frame 12, the central bracket bearing and the disk 25 are united together by countersunk headed bolts 26 which pass through and are slidable in concentric slots in the disk 25, and when these bolts are loosened, the whole of the saw support may be turned entirely around as previously stated. The concentric slots or channels in the disk 25, are formed by bolting concentric rings to a plate on the main frame. These rings are of such diameters that a space or channel is formed between the outer periphery of one ring, and the inner surface of the other. The distance-piece A is formed of parallel plates, and these have spacing-blocks a riveted between thus forming a stiff construction.

In order to conveniently raise and lower the forward end of the saw, turning about the rear driving shaft, I have provided a frame 17 having a projecting boom or jib, which carries a pulley 19 at its outer end. A wire rope 30 is secured to the bar 20 from which the outer sprocket is supported, thence passing around the direction pulleys, is led to a winding drum or shaft 21, where by means of a crank or equivalent operating device 22, a single operator may raise the saw out of the cut or depress it to its work.

After a cut has been completed, the saw may be raised out of the cut, and the main carrying frame 12ª may be moved transversely to any desired distance, being mounted upon a sled or support so that when clear of the log, the whole apparatus may be moved transversely and sufficiently to place the saw in position for a new cut. This movement may be effected by means of a revoluble screw shaft 28 journaled to the support 29, and the threaded portion turnable in nuts upon the movable frame, so that it may be moved along the main frame to bring the saw into position for a new cut. The main movement may be effected by means of horses or other power; and the above described movement serves for the more exact adjustment to the mark for the new cut.

The lead of the ropes 30 is more plainly shown in Fig. 9 in which the outer ropes diverge from the transverse bar 20 to the pulleys on the ends of the longer transverse bar 31, thence returning to a shorter transverse bar 32, over pulleys thereon, and thence in parallel lines to the winding drum 21. The inner ropes 30ª are attached to the bar 20 between the outer ropes 30 and the center of the bar, and cross each other to the pulleys 19ª on the bar 31, thence returning over pulleys on the bar 32 and leading parallel to the winding drum. This disposition of the ropes acts to brace the outer transverse bars, preventing them from swaying when the saw is lifted, and insuring a substantially straight vertical movement of the saw frame as it is raised or lowered.

Having thus described my invention, what I claim and desire to secure by Letters Patent is—

1. A chain sawing apparatus having in combination a distance piece, grooved sprocket wheels at opposite ends thereof, an endless flexible chain saw passing around said sprocket wheels, means for operating the chain, and means for raising and lowering the distance piece and its chain, said means comprising a stationary boom or jib, a winding drum on said frame, direction pulleys on the boom, ropes passing from said drum over said pulleys and having their free end connected to the outer end of the distance piece, and a turn table connection between the inner end of the distance piece and said frame, said turn table permitting the saw to cut horizontally, vertically or at an angle between the horizontal and vertical.

2. A chain sawing apparatus having in combination a main frame, a frame secured thereto, a shaft mounted in the outer end of the second frame, an endless traveling chain saw having its inner end hung upon said shaft, a shaft extending transversely through the main frame and second-named frame, driving connections between the two shafts for operating the chain saw, a turn table connection between said frames, said connection comprising concentric rings provided with channels, and securing bolts engaging the channels whereby the saw may be turned about the transverse shaft as an axis and be made to operate either horizontally or vertically or at an angle between the horizontal and vertical.

3. In a sawing apparatus of the character described, an endless chain saw, a distance-piece, sprockets journaled at each end of said distance-piece, a driving shaft to which the inner sprocket is fixed, a gear wheel on said shaft, a pinion engaging the gear-wheel, a pinion shaft extending at right angles and connecting with the motor, a frame upon which the said shafts are journaled, said frame having channels concentric with the pinion shaft, and locking bolts and nuts whereby the saw-carrying frame may be turned about the power shaft and locked at any desired position.

4. In a chain sawing apparatus of the character described, an endless chain saw, grooved sprocket-wheels, a channeled direction plate at the ends of which the sprocket-wheels are journaled, a driving-shaft to which the inner sprocket-wheel is fixed, a frame upon which said shaft is journaled, means for transmitting power thereto, and means for raising and lowering the saw, said means comprising a boom or jib mounted upon the main frame, direction pulleys and a winding drum mounted with relation thereto, wire ropes passing around the drum and pulleys, a yoke connected with the outer end of the distance piece and the outer sprocket pulley, the winding ropes having their outer ends connected with said yoke.

5. A chain sawing apparatus comprising a main frame and a boom or jib mounted thereon, a chain saw and means hingedly securing its inner end to said frame, a cross bar at the outer end of said saw, a cross bar at the outer end of the jib or boom and a bar extending across the intermediate portion of the boom, pulleys on said second and third bars, a winding drum on the main frame, hoisting ropes having one end connected to the cross bar at the outer end of the chain saw thence extending around the guide pulleys on the bars at the outer and intermediate portion of the boom or jib to said drum, other hoisting ropes having one end connected to the boom at the outer end of the chain saw, said ropes crossing each other and extending around the pulleys on the bars at the outer and intermediate portions of the jib or boom and connected to said winding drum, whereby the saw may be raised and depressed, and held against side swaying movement.

6. In an apparatus of the character described; an endless chain saw, a frame with sprockets at either end around which the saw is caused to travel, a power transmitting shaft upon which the inner sprocket is mounted, a jib or derrick projecting above the outer end of the saw, transverse bars having direction pulleys thereon, a winding drum, hoisting ropes extending therefrom, direction pulleys over which the ropes pass, said ropes extending diagonally from the inner to the outer transverse frame, and forming braces to prevent side swaying movement.

In testimony whereof I have hereunto set my hand in presence of two subscribing witnesses.

REGINALD L. MUIR.

Witnesses:
   GEO. H. STRONG,
   CHARLES EDELMAN.